(No Model.)
H. A. KINGSLAND & W. P. SANGER.
CLUTCH AND MOTOR CONNECTION FOR SAME.
No. 547,121. Patented Oct. 1, 1895.
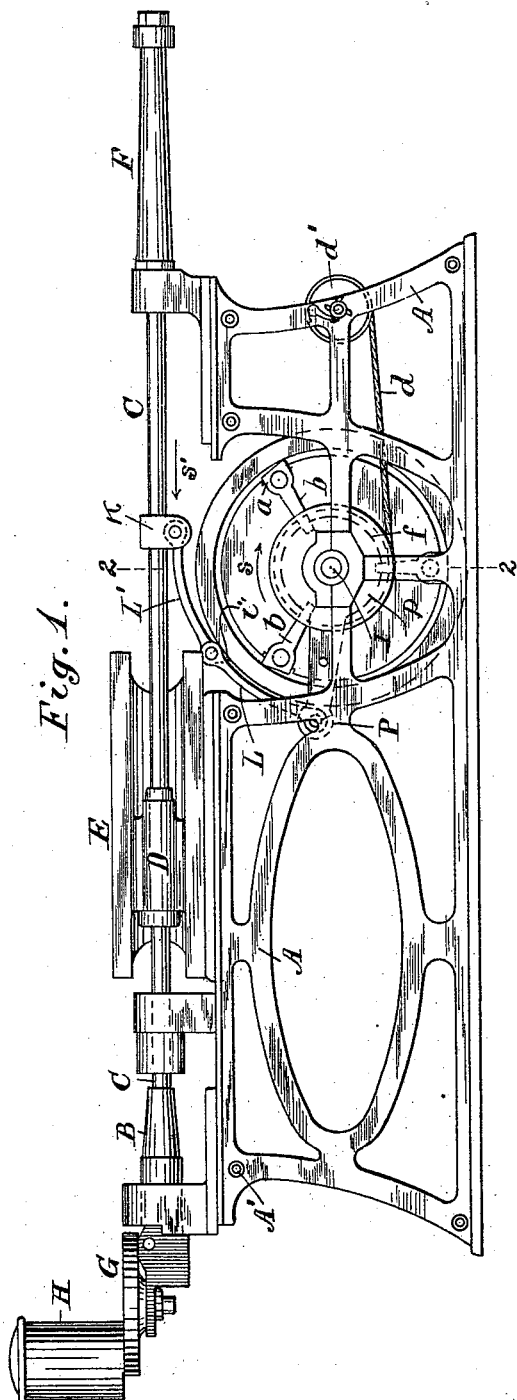
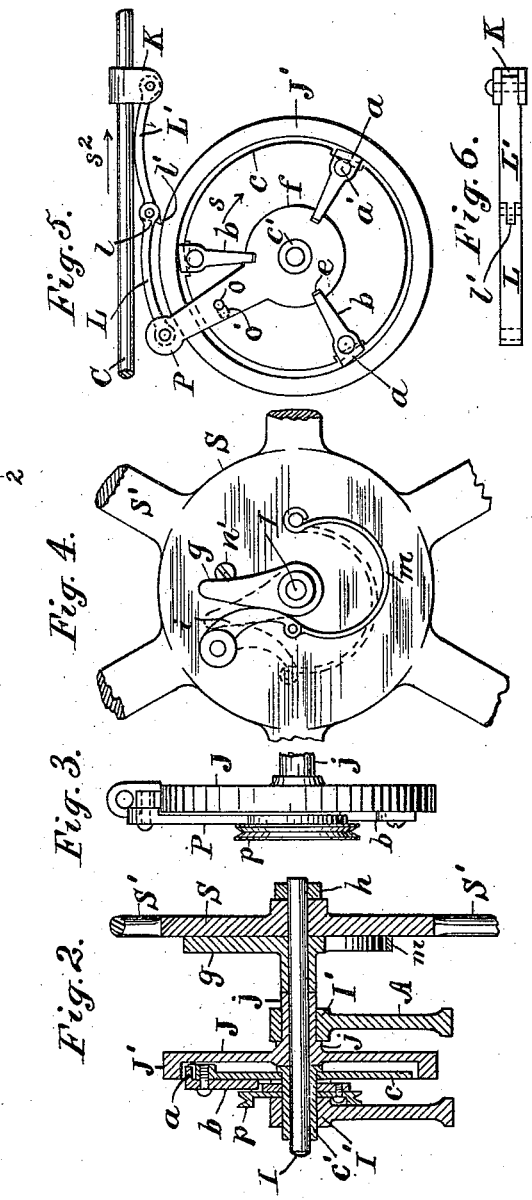
Attest:
L. Lee.
Edw. F. Kinsey.
Inventors.
Hugh A. Kingsland
Whiting P. Sanger,
per Thomas S. Crane, Atty.

UNITED STATES PATENT OFFICE.

HUGH A. KINGSLAND, OF BELLEVILLE, AND WHITING P. SANGER, OF EAST ORANGE, NEW JERSEY.

CLUTCH AND MOTOR CONNECTION FOR SAME.

SPECIFICATION forming part of Letters Patent No. 547,121, dated October 1, 1895.

Application filed February 4, 1895. Serial No. 537,180. (No model.)

*To all whom it may concern:*

Be it known that we, HUGH A. KINGSLAND, of Belleville, and WHITING P. SANGER, of East Orange, Essex county, New Jersey, citizens of the United States, have invented certain new and useful Improvements in Clutch and Motor Connections to the Same, fully described and represented in the following specification and the accompanying drawings, forming a part of the same.

The present improvements relate to that class of motors in which an explosive agent, as gas, naphtha, or gunpowder, is used to generate the propelling force; and the object of the invention is to transmit such force to a rotary shaft. To effect such object the explosive force is applied to reciprocate a rod or piston, and such reciprocating motion is transferred to the rotary shaft by a clutch and connections of particular construction, as hereinafter fully set forth.

The invention is especially adapted for motors in which explosives of high power are used, and such a motor provided with the improvements is shown in the annexed drawings, in which—

Figure 1 represents the motor in side elevation. Fig. 2 is a vertical cross-section of the driving-clutch and frame of the motor on line 2 2 in Fig. 1. Fig. 3 is an edge view of the clutch and the oscillating arm P. Fig. 4 is a side view of the elastic transmitter with its nearer plate removed. Fig. 5 is a side elevation of the clutch. Fig. 6 shows the inner sides of the links L L' and their connections to the piston-rod.

The hub of a fly-wheel S' is shown in Fig. 2 applied to the end of the driving-shaft where the latter overhangs the rear side of the frames A; but such fly-wheel is omitted from Fig. 1, as it would lie in the rear of the clutch-disk shown in said figure and would be obscured thereby.

A designates the side frames of the apparatus shown in Figs. 1 and 2 and connected by ties A'.

B is the power-cylinder into which the driving-rod C is fitted. The rod is provided with cross-head D to fit guides E, and its outer end is fitted to an air-cushion chamber F. A feed-disk G is shown, with powder-reservoir H, by which successive charges of explosive powder may be supplied to the cylinder B and fired by suitable means.

I designates the motor-shaft mounted in bearings I' across the frames A, and J the clutch-disk, having hollow rim J', within which the heads $a$ of clutch-levers $b$ are fitted. The arms are pivoted to a clutch-plate $c$, which is mounted loosely upon a sleeve $c'$, clamped in one of the bearings I' and projected inward to the face of the clutch-disk J. The clutch-disk J is formed with hub $j$, which is attached to the shaft I and revolves within the outer bearing I'. An oscillating arm P is fitted to turn upon the sleeve $c'$ outside of the clutch-plate, and is provided with a grooved pulley $p$ and cord $d$, attached to the spring-box $d'$. The arm P is formed with an enlarged hub $f$, having notches $e$, to which the inner ends of the clutch-levers $b$ are fitted. A pin $o$ upon the arm P is fitted to a slot $o'$ in the clutch-plate to limit the movement of the arm upon the plate, such movement permitting only a sufficient turning of the clutch-levers upon their fulcra $a'$ to engage the heads of the clutch-levers with the rim J'. The pin $o$ serves thereafter as a means of turning the clutch-plate with the arm to rotate the clutch and the shaft attached thereto. A block K is secured upon the piston-rod, and is connected with the outer end of the arm P by jointed links L L'. The links where coupled together are formed, respectively, with shoulders $l\ l'$, which when the outer ends of the links are forced together permit them to bend into conformity with the periphery of the rim I', as shown in Fig. 1, but prevent any further flexure.

The piston-rod is shown nearly retracted in Fig. 1 and fully extended in Fig. 5 to exhibit the arrangement of the arm P and the connecting-links in such positions.

The link L' is preferably shaped upon its outer side to touch the piston-rod C when fully extended, as shown in Fig. 5. The shaft I is intended to rotate forwardly, as indicated by the arrows $s$ in Figs. 1 and 5, and the heads $a$ of the clutch-levers are sloped in the opposite direction, so as to clear the inside of the rim J' when the arm P is moved backwardly by the rod C, as indicated by the arrow $s'$ in Fig. 1. The movement of the piston-rod and arm P in the opposite direction, as indicated by the arrow $s^2$ in Fig. 5, turns the hub $f$ forwardly and crowds the front corners of the heads $a$ against the rim, thus clutching the arm P to the rim and rotating it forward with the shaft I.

In the practical operation of this motor the explosion of a charge in the cylinder B drives the rod C forward, thus drawing upon the links L L', which can lie in contact with the rim J', as shown in Fig. 1, and rotate the shaft by the operation of the clutch-levers. The piston-rod is driven into the air-cushion cylinder F, where the confined air operates to drive the rod back into the cylinder B. During such reverse movement the links L L' force the oscillating arm P back to its initial position, during which movement the links are prevented from buckling by the contact at first of the link L' with rod C and afterward by the contact of the shoulders $l\,l'$. By using two links, and thus forming a jointed connection between the block K and arm P, the motion is transmitted from the block to the arm in as direct a line as possible in all positions of the parts, and the arm is pulled at right angles to the radius of the clutch whatever the position of the parts, as is shown in the two positions illustrated in Figs. 1 and 5. This construction of the links furnishes a means of oscillating the arm P without the use of the cord $d$ and spring-box $d'$; but the pull of the cord when used serves to maintain a tension upon the links L L', and thus prevents them from needless rattling or vibration. The jointed links also permit the use of a long connection between the block K and the arm P, so as to oscillate the arm through a much larger arc than is possible with a single link. A single link is seldom adapted to vibrate an arm more than ninety degrees, while the construction shown herein is, with proper proportions, adapted to vibrate the arm nearly one hundred and eighty degrees. The momentum of the clutch-disk, which is attached to the shaft, keeps the shaft in motion intermediate to the successive explosions; but a supplemental fly-wheel may be attached to the shaft to maintain and regulate the motion, and such fly-wheel may be driven from the shaft by a yielding connection to transmit the power without shocks or jars. Such yielding connection is shown in Figs. 2 and 4, where only the flattened hub S of the fly-wheel is represented with the inner ends of the spokes S'. An arm $g$ is fixed to the shaft I between the bearing and the fly-wheel, which latter is fitted to turn upon the shaft between such arm and a collar $h$. A spring-dog $i$ is pivoted upon the face of the hub S to receive the first impulse of the arm $g$ and to gradually transmit the initial motion to the hub S. The dog is pressed toward the arm $g$ by a stiff spring $m$, and its hub is arranged to contact with the arm after a given elastic motion. The position of the parts at the close of such elastic motion is indicated by dotted lines in Fig. 4. The stop $n'$ limits the movement of the arm $g$ when at rest. The spring-dog is so pivoted and its face curved in such a manner as to make contact with the arm $g$ gradually farther and farther from its center, thus increasing the force transmitted until the whole movement of the arm and the shaft I is communicated to the wheel.

From the above description it will be seen that the clutch by its momentum is adapted to revolve independently of the oscillating arm P, which carries the clutch-arms $b$, and that the shaft I, to which the clutch-disk is fastened, is also able to rotate a short distance in transmitting its motion to the fly-wheel hub S before it drives the latter with its own velocity, thus imparting the desired motion to the fly-wheel with the least possible shock.

It will be observed that the rod C is of considerable length, so that its weight and inertia resist the first shock of the explosion and absorb a part of its energy, by which construction the force is imparted to the clutch and the fly-wheel in a more gradual manner than with a very light piston-rod. The clutch mechanism described herein and its connection to the reciprocating piston-rod may be used in connection with gas-engines or others of different construction from that shown herein, and no claim is therefore made herein to the means for propelling the piston-rod.

The motor-shaft I is shown beneath the piston-rod in the drawings; but it may with equal propriety be arranged above or at either side of the same, provided it is arranged transverse to the rod.

It is obvious that other means than the pin-and-slot connection shown at $o\,o'$ between the arm P and the clutch-plate $c$ may be used to limit the motion of the arm in relation to the plate, and any suitable stop may therefore be used for such purpose, it being understood that the stop may be adjustable, if desired, to regulate the bite of the clutch-lever heads $a$, and that such stop after the heads are engaged with the rim of the clutch-disk transmits the entire power of the piston-rod to the shaft I.

Having thus set forth the nature of the invention, what is claimed herein is—

1. A clutch for motor shafts, consisting of the rim J' suitably attached to the motor shaft, the clutch plate $c$, clutch levers $b$ carried by said clutch plate and having heads to engage the inside of the rim, the arm P with notched hub fitted to the clutch levers $b$ and means for oscillating the arm, substantially as set forth.

2. The combination, with a reciprocating piston rod, of a shaft transverse to the same, a clutch disk having a rim attached thereto, a clutch plate, levers carried by said clutch plate having heads to engage the inside of the rim, the arm P provided with hub $f$ notched to fit the clutch levers $b$, the pin $o$ carried by said arm and engaging a slot $o'$ in said clutch plate, and the piston rod with block and suitable connections to oscillate the arm, substantially as set forth.

3. The combination, with a reciprocating piston rod, of a shaft transverse to the same, a clutch disk attached thereto, a clutch plate oscillating upon the shaft suitable means to engage the disk in one direction, an arm for oscillating the clutch plate, a block attached to the piston rod, and the links L, L', connecting the block with the oscillating arm, and said links being provided with the shoulders $l$, $l'$, as set forth.

4. The combination, with a reciprocating piston rod, of a shaft transverse to the same, a clutch disk attached thereto, a clutch plate oscillating upon the shaft, suitable means to engage the disk in one direction, an arm for oscillating the clutch plate, means as the pulley $p$ attached to such arm with cord $d$ and spring box $d'$ for reversing the motion of the arm, a block attached to the piston rod and jointed links connecting said block and arm to oscillate the arm, as herein set forth.

5. In a motor having the piston rod propelled by explosive force, the combination, with the piston rod and the shaft I impelled intermittingly thereby, of a wheel having its hub S mounted loosely upon the said shaft, the stop $n'$ and dog $i$ mounted upon said hub, the spring $m$ acting upon the dog, and the shaft having the arm $g$ attached to said shaft and adapted to contact with the stop and the dog, the whole arranged and operated to take up the initial motion of the shaft.

In testimony whereof we have hereunto set our hands in the presence of the subscribing witnesses.

HUGH A. KINGSLAND.
WHITING P. SANGER.

Witnesses:
JOHN S. SANGER,
R. M. SANGER,
T. S. CRANE.